C. C. WAKEFIELD.
AUTOMATIC REGULATOR FOR ACETYLENE GAS GENERATORS.
APPLICATION FILED AUG. 26, 1910.
983,255.
Patented Jan. 31, 1911.
2 SHEETS—SHEET 2.
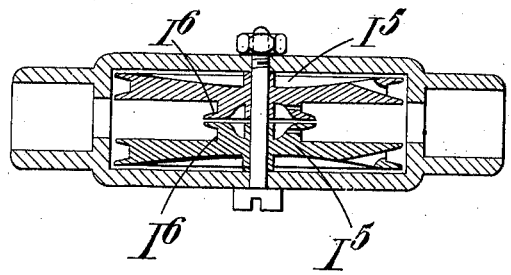
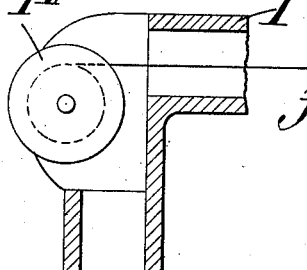
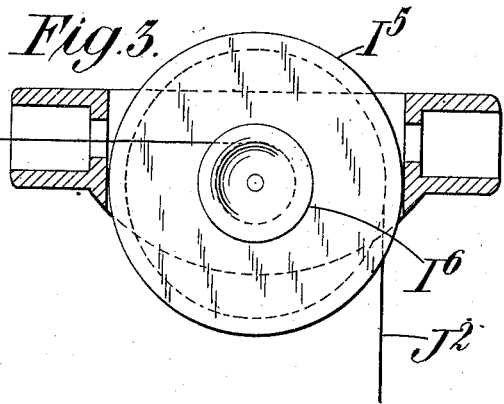
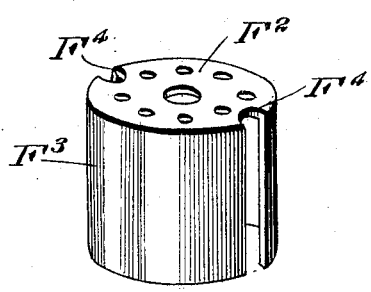
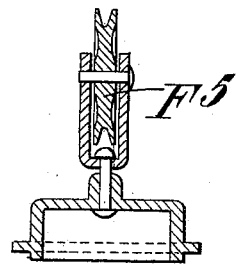

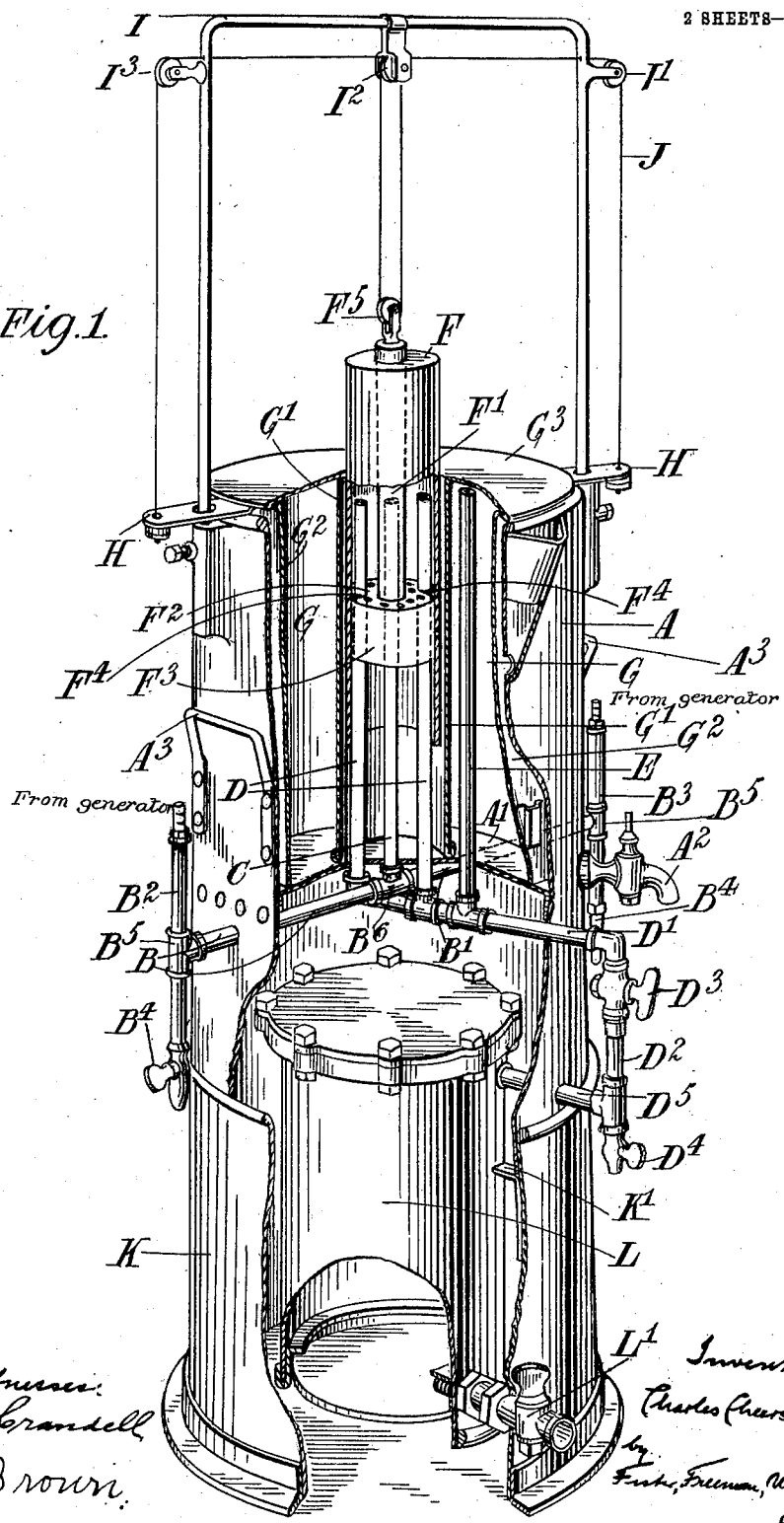

UNITED STATES PATENT OFFICE.

CHARLES CHEERS WAKEFIELD, OF LONDON, ENGLAND.

AUTOMATIC REGULATOR FOR ACETYLENE-GAS GENERATORS.

983,255.    Specification of Letters Patent.    Patented Jan. 31, 1911.

Application filed August 26, 1910. Serial No. 579,012.

*To all whom it may concern:*

Be it known that I, CHARLES CHEERS WAKEFIELD, a subject of the King of England, and residing at London, England, have invented certain new and useful Improvements in Automatic Regulators for Acetylene-Gas Generators, of which the following is a specification.

This invention is for improvements in or relating to automatic regulators for acetylene gas generators for use with generators of the displacement type, that is to say, generators in which increase of gas pressure tends to drive the water away from the carbid thereby diminishing or arresting generation and vice versa; and relates to that type of gas regulator comprising a regulator bell and a large bell which receives the gas from the regulator bell, both bells being partially immersed in water, a conduit from the generator to the regulator bell, an outlet conduit from the large bell and an automatic connection between the bells such that when the large bell rises the regulator bell falls and vice versa. The arrangement is such that when the quantity of gas is excessive the large bell raises and lowers the regulator bell farther into the water so as to increase the head of pressure at the generator and drive the water away from the carbid and vice versa whereby the regulator bell regulates the pressure of the gas in the generator.

According to this invention an automatic gas regulator comprises a regulator bell, divided into two or more vertical compartments and a large bell all partially immersed in water, a conduit from the generator to one or more of the compartments of the regulator bell, one or more conduits connecting the other compartment or compartments of the regulator bell both with the large bell and with the outlet and an operative connection between the large bell and the regulator bell.

This invention further relates to an automatic regulator comprising a regulator bell and a large bell in which the large bell surrounds the regulator bell which extends or moves outside the large bell so that all waste space in the large bell is dispensed with. For example, the large bell may be made annular and the regulator bell can be disposed in the center thereof.

The gas from one or more of the compartments of the regulator bell bubbles out at the bottom through the water into the other compartment or compartments of the regulator bell and in so doing is cleaned and cooled. To increase this effect, the regulator bell may be combined with a washer or perforated plate at the lower end of one or more of the compartments of the regulator bell so that the gas in passing from compartment to compartment is sprayed and washed.

The normal head of pressure in the regulator bell and therefore in the generator depends upon the extent to which the regulator bell is immersed in the water. This pressure can be varied to suit the generator by an adjustment in the operative connection between the regulator bell and the large bell.

A practical construction of the regulator bell comprises a small bell having a jacket bell surrounding it the jacket bell being adapted to receive gas from the small bell The weight of the regulator bell is small in comparison with that of the large bell so that the movements of the regulator bell do not materially affect the movements of the large bell nor the pressure therein.

The weight of the large bell can be varied to adjust the pressure of the gas supplied therefrom, the operative connection between the bells being adjusted accordingly.

The accompanying drawings show one method of carrying this invention into effect, Figure 1 showing an automatic regulator in perspective and partly broken away. Figs. 2, 3, 4 and 5 illustrate modifications to be afterward described. Fig. 6 is a detail view of an interior part of the apparatus.

A long vertical galvanized iron cylinder A is divided into two portions by means of a horizontal metal plate A' arranged at any suitable distance from the top. This metal plate is suitably riveted and soldered so that the top portion of said cylinder shall be water tight and forms a water tank. Two holes diametrically opposite each other are drilled just below the metal plate for two horizontal pipes B B' which are connected to two vertical pipes $B^2$ $B^3$ which are connected to the gas generator; suitable taps $B^4$ and connections $B^5$ being provided. These two pipes are joined together by means of a three-way coupling $B^6$ the third part of which passes through a hole in the center of the bottom of the tank and is attached to a vertical gas inlet pipe C which is situated in the center of the water tank extending its entire length. On either side of this pipe are two other vertical gas outlet pipes D of a suitable diameter and length. These two pipes D pass through the bottom of the water tank and are attached by means of suitable couplings to a horizontal outlet pipe D' which extends through the side of the bottom portion and leads to the purifier which will be described farther on. A fourth vertical pipe E of suitable diameter is also situated within the water tank nearer the periphery and extends the full length thereof. This pipe also passes through the base of the water tank and is suitably attached to the last mentioned horizontal outlet pipe D' which leads to the purifier. This horizontal outlet pipe D' which leads to the purifier is joined to a vertical pipe $D^2$ which is provided with a suitable valve $D^3$ to turn off the gas and also a drain cock $D^4$.

A long cylindrical tube F of a diameter slightly in excess of the external distance between the two vertical pipes D on either side of the central pipe C slides over these pipes D and has the upper end closed so as to form a bell hereinafter called the jacket bell. From the top or closed end there extends inside this bell for about three quarters of its length and down its center, a pipe or sleeve F' of greater diameter than the central pipe and inclosing the same, hereinafter called the small bell these two bells thus form two vertical compartments. The jacket bell and small bell just described form a convenient construction of a regulator bell. Attached to the lower end of this small bell is a perforated annular metal plate $F^2$ which forms a washer and attached to this metal plate is a downwardly extending flange $F^3$. The metal plate $F^2$ is provided with two semicircular recesses $F^4$ opposite to each other, the flange being similarly bent to engage the two vertical outlet pipes D which act as guides for the movement of the sleeve.

To the top of the jacket bell F a pulley $F^5$ is attached so that it can be rotated to take up its required position as will be afterward described. Surrounding this jacket bell is another annular bell G for convenience referred to as the large bell.

The large bell G is of a diameter less than that of the water tank and is made of the same material as the other parts described. It consists of two concentric cylinders $G'$ $G^2$ connected at the top by an annular metal plate $G^3$. When the large bell is in position it fits loosely into the water tank, the fourth vertical pipe E in the water tank projecting up into the large bell. The jacket bell F lies in the center thereof. The top or metal plate $G^3$ of the large bell is of slightly larger diameter than the cylindrical portion thus forming a flange to which two lugs H are attached opposite to each other.

An inverted U-shaped frame I is attached to the outside of the water tank, and carries pulleys $I'$, $I^2$, $I^3$. The regulator and large bells are connected by a cord J passing over the pulleys so that as the large bell rises the regulator bell falls and vice versa.

This whole apparatus as just described stands inside a hollow cylindrical vessel K of slightly larger diameter than the water tank and about half the height. Four brackets K' are provided on the inner side of the vessel K and on said brackets rests the lower edge of the cylinder A, as shown in Fig. 1, so that the water tank and parts carried thereby are supported on said brackets. Within the vessel K and extending up into the space in the cylinder A beneath the water tank is arranged a purifier L. The vertical pipe $D^2$ before mentioned is connected to a horizontal gas inlet pipe $D^5$ of the purifier. A hole is drilled in the side of this vessel near the bottom for the gas outlet pipe L' from the purifier. A tap $A^2$ is provided in the base of the water tank, and the latter has also two handles $A^3$ one on either side.

The operation of the device is as follows:—The gas from the displacement generator passes through the inlet pipe B B' $B^2$ $B^3$ and C, to the top of the small bell F', displaces the water entirely therefrom and bubbles through the washer $F^2$ in the bottom into the jacket bell F. From the jacket bell F the gas is led to the purifier L through the outlet pipes D and D', the latter of which also communicates through the pipe E with the top of the large bell G and from the purifier the gas is led to the burners. When the demand ceases the large bell acts as a holder for the after generation. The normal action of the bells is as follows:— When the demand of gas is great the large bell G falls to its lowest position so that the small bell F' is in its highest position and the head of water, that is the pressure therein is reduced to a minimum. This allows the water in the generator to come fully into contact with the carbid and generate as rapidly as possible. On the other hand when the demand diminishes the large bell rises and causes the small bell to fall, thereby increasing the pressure therein and driving the water away from the carbid in the generator. By varying the length of the cord between the bells and by varying the weight of the large bell the normal pressure in the regulator bell and the large bell can be suitably modified. The large bell and the regulator bell may be so connected by the cord or other gearing that for a small movement of the large bell there is a much greater movement of the regulator bell so that the generation may be quickly arrested if need be. Figs. 2, 3, 4 and 5 show a method of carrying this latter operation into effect, and also certain other modifications.

The top pulleys $I^3$ and $I'$ Fig. 1 are replaced by pulleys such as $I^4$ shown in Fig. 2. The pulleys $I^2$ are replaced by pulleys $I^5$ and $I^6$ Figs. 3 and 4. The two pulleys $I^5$ are independent of one another and each pulley $I^5$ (large pulley) has formed on or attached to it a smaller pulley $I^6$. A cord $J'$ is attached to one of the lugs H of the large bell G in the same manner as described with reference to the cord J. It passes over the pulley $I^4$ and is attached to one of the small pulleys $I^6$. Another cord is similarly attached to the other lug H of the large bell and to the other small pulley $I^6$. A cord $J^2$ is passed under the pulley $F^5$, which in this case is attached to the small bell so as to be capable of rotation for the purpose of taking up its required position, and is attached at its ends respectively to the two large pulleys $I^5$. The cord is arranged so that when the large bell is in its lowest position the cord $J^2$ is wound around the large pulleys $I^5$ and vice versa. It will be seen that owing to the pulleys $I^5$ being much larger than the pulleys $I^6$ a small movement of the large bell will produce a large movement of the small bell.

As shown in Figs. 2, 3 and 4 the horizontal bar of the frame I is made tubular the cord $J'$ passing through it. The perforations and adjustments of the bells may for example be such that the head of pressure in the large bell is normally four inches of water while the head of pressure in the regulator bell is normally eleven to twelve inches of water.

This device permits of a very wide latitude of pressure in the generator. It is to be noticed that the gas way from the jacket bell F and the large bell G is open at all times. The large bell regulates the generation of gas in proportion to the immediate consumption. It does not act as a storage holder except as regards after-generation and consequently can be made in a much smaller and more compact form than usually obtains. This device has the advantage that there are no mechanical valves to stick or get out of order.

There are various ways in which the construction of the device may be modified. For example, the jacket bell need not be concentric with the large bell the two may be side by side in one water tank or in different water tanks. Further the regulator bell might comprise three small bells connected together and adapted to fit over the conduits C and D. Again any suitable form of gearing could be used as a balance connection instead of the cord and pulley.

What I claim as my invention and desire to secure by Letters Patent is:—

1. In an automatic gas regulator, the combination of a tank, a relatively large bell within the tank, a second regulator bell extending through the upper end of the large bell and having its interior divided into two concentric compartments, a perforated plate extending across the compartments of the regulator bell, a pipe for supplying gas to the inner compartment of the regulator bell, an outlet pipe communicating with the other compartment of the regulator bell and with the large bell, and means connecting the bells.

2. In an automatic gas regulator, the combination of a tank, a delivery pipe extending into the tank and provided with three upwardly extending branches, a bell within the tank surrounding all of said branch pipes, a second, "regulator," bell movable through the upper end of the first said bell and surrounding two of said branch pipes, said regulator bell having its interior divided into two compartments, one of which receives said branch pipes, a perforated diaphragm extending about the inner compartment of the last said bell and engaging the said pipes, a supply pipe extending into the inner chamber of said regulator bell, and means connecting the bells, for the purpose described.

In testimony whereof I have signed my name to this specification in the presence of two subscribing witnesses.

CHARLES CHEERS WAKEFIELD.

Witnesses:
HARRY S. BRIDGE,
CLAUDE S. R. McRUZIE.